(12) United States Patent
El Mallawany (10) Patent No.: US 10,526,858 B2
(45) Date of Patent: Jan. 7, 2020

(54) SINGLE POINT METAL TO METAL SEAL

(71) Applicant: HALLIBURTON ENERGY SERVICES, INC., Houston, TX (US)

(72) Inventor: Ibrahim El Mallawany, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 339 days.

(21) Appl. No.: 15/529,055

(22) PCT Filed: May 5, 2016

(86) PCT No.: PCT/US2016/031042
§ 371 (c)(1),
(2) Date: May 23, 2017

(87) PCT Pub. No.: WO2017/192142
PCT Pub. Date: Nov. 9, 2017

(65) Prior Publication Data
US 2018/0202251 A1    Jul. 19, 2018

(51) Int. Cl.
*E21B 33/00*    (2006.01)
*F16J 15/08*    (2006.01)
(Continued)

(52) U.S. Cl.
CPC ............. *E21B 33/00* (2013.01); *E21B 33/10* (2013.01); *E21B 34/14* (2013.01);
(Continued)

(58) Field of Classification Search
CPC .......... E21B 33/00; E21B 33/10; E21B 33/03; E21B 33/035; E21B 2033/005;
(Continued)

(56) References Cited

U.S. PATENT DOCUMENTS 6,086,069 A * 7/2000 Bedford ............... F16J 15/344
                                                      277/358
6,945,536 B2 * 9/2005 Iwakata ............... F16J 15/164
                                                      277/552
(Continued)

OTHER PUBLICATIONS

PCT International Search Report and Written Opinion, dated Jan. 16, 2017, Appl No. PCT/US2016/031042, "Single Point Metal to Metal Seal," Filed May 5, 2016, 17 pgs.

*Primary Examiner* — Nathan Cumar
(74) *Attorney, Agent, or Firm* — Benjamin Fite; Parker Justiss, P.C.

(57) ABSTRACT

A metal to metal seal and method including a first sealing member and a second sealing member, wherein the first and second sealing members are attached together to form a cylindrical sealing device; a first sealing surface and a second sealing surface on the first sealing member and the second sealing member, wherein the first and second metal sealing surfaces form a metal to metal seal with an internal cylindrical sealing surface and an external cylindrical sealing surface respectively; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

22 Claims, 6 Drawing Sheets

(51) Int. Cl.
*F16L 5/10* (2006.01)
*E21B 33/10* (2006.01)
*E21B 34/14* (2006.01)
*E21B 34/00* (2006.01)

(52) U.S. Cl.
CPC ..... *F16J 15/0887* (2013.01); *E21B 2033/005* (2013.01); *E21B 2034/007* (2013.01); *F16L 5/10* (2013.01)

(58) Field of Classification Search
CPC .............. E21B 2034/007; F16J 15/0887; F16J 15/0893; F16J 15/10; F16J 15/14; F16J 15/08; F16L 5/10; F16L 5/14
USPC ......................................................... 277/322
See application file for complete search history.

(56) References Cited

U.S. PATENT DOCUMENTS

| | | | | |
|---|---|---|---|---|
| 8,794,638 | B2* | 8/2014 | Tuckness | E21B 33/10 277/335 |
| 8,894,070 | B2* | 11/2014 | Bhat | E21B 33/1212 277/335 |
| 2005/0109502 | A1* | 5/2005 | Buc Slay | B82Y 30/00 166/179 |
| 2009/0194945 | A1* | 8/2009 | Bhat | E21B 33/1212 277/300 |
| 2009/0277642 | A1* | 11/2009 | Curington | E21B 34/06 166/316 |
| 2013/0020799 | A1* | 1/2013 | Silveira | F16L 19/08 285/351 |

* cited by examiner

SINGLE POINT METAL TO METAL SEAL

BACKGROUND

In oil and gas wells, metal seals are sometimes used to seal between structures in well tools, and in equipment used in other environments. However, several problems are frequently encountered when metal seals are used. For example, metal seals require very smooth and clean surfaces to seal against, and most metals can only be elastically deformed to a limited extent (which thereby limits the biasing force available from elastically deforming a metal seal), etc.

Elastomeric and other types of nonmetal seals may provide the ability to seal against irregular and unclean surfaces, and may provide sufficient resilient biasing force for urging the seals against the surfaces. However, nonmetal seals tend to degrade rapidly when used in dynamic configurations, i.e., where the seal must contact a moving surface while sealing against a pressure differential, or where the seal loses contact with the surface while the pressure differential still exists across the seal.

Metal to metal seals are preferred in some applications over elastomeric seals. An advantage of metal to metal seals is their wear capabilities, a property that is needed for dynamic seals and especially important when unloading pressure (when a seal opens up with a pressure differential such as in valves). Radial metal to metal seals that have two points of contact that will only seal in one direction like, for example, metal C-ring seals. To seal in both directions one needs at least four points of contact. The problem with having four points of contact is that they create pressure traps between them that can significantly increase stroking pressure.

Therefore, a need has arisen for an improved metal to metal seal for reliable low and high pressure sealing.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The disclosure is generally directed to two-directional metal to metal seals with only two contact points for reliable low- and high-pressure sealing. The metal to metal seal contains an elastomeric portion that is substantially static.

A wellbore tool may comprise an internal cylindrical sealing surface; an external cylindrical sealing surface; and a sealing device for sealing between the internal and external cylindrical surface, the sealing device comprising: a first sealing member and a second sealing member, wherein the first and second sealing members are attached together to form a cylindrical sealing device; a first sealing surface and a second sealing surface on at least one of the first sealing member, the second sealing member, and combinations thereof, wherein the first metal sealing surface forms a metal to metal seal with the internal cylindrical sealing surface, and the second metal sealing surface forming a metal to metal seal with the external cylindrical sealing surface; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

The energization of the nonmetal seal may bias the first sealing surface against the internal cylindrical sealing surface and biases the second sealing surface against the external cylindrical sealing surface. The bias may be adjusted by altering the flexibility of at least one of the walls of at least one of the first sealing member, second sealing member, and combinations thereof. The flexibility of the at least one wall may be altered by adjusting the length, thickness, and combinations thereof, of the at least one wall. The tool may further comprise at least one backup in the recess. The backup material may be at least one selected from the group consisting of plastic, PTFE, metal, and combinations thereof. The first and second sealing members may be attached by at least one of bolts, e-beam welding, and combinations thereof. The first metal sealing surface may only have one metal to metal contact surface with the internal cylindrical sealing surface, and the second metal sealing surface may only have one metal to metal contact surface with the external cylindrical sealing surface. Each of the metal to metal contact surfaces may be an equatorial ridge on each of the first and second metal sealing surfaces.

A sealing device may comprise: a first sealing member and a second sealing member, wherein the first and second sealing members are attached together to form a cylindrical sealing device; a first sealing surface and a second sealing surface on at least one of the first sealing member, the second sealing member, and combinations thereof, wherein the first metal sealing surface forms a metal to metal seal with an internal cylindrical sealing surface, and the second metal sealing surface forming a metal to metal seal with an external cylindrical sealing surface; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

The energization of the nonmetal seal may bias the first sealing surface against an internal cylindrical sealing surface and biases the second sealing surface against an external cylindrical sealing surface. The bias may be adjusted by altering the flexibility of at least one of the walls of at least one of the first sealing member, second sealing member, and combinations thereof. The flexibility of the at least one wall may be altered by adjusting the length, thickness, and combinations thereof, of the at least one wall. The seal may further comprise at least one backup in the recess. The backup material may be at least one selected from the group consisting of plastic, PTFE, metal, and combinations thereof. The first and second sealing members may be attached by at least one of bolts, e-beam welding, and combinations thereof. The first metal sealing surface may only have one metal to metal contact surface with an internal cylindrical sealing surface, and the second metal sealing surface may only have one metal to metal contact surface with an external cylindrical sealing surface. Each of the metal to metal contact surfaces may be equatorial ridges on each of the first and second metal sealing surfaces.

A method of sealing may comprise: providing a sealing device, comprising: a first sealing member and a second sealing member, wherein the first and second sealing members are attached together to form a cylindrical sealing device; a first sealing surface and a second sealing surface on at least one of the first sealing member, the second sealing member, and combinations thereof, wherein the first metal sealing surface forms a metal to metal seal with an internal cylindrical sealing surface, and the second metal sealing surface forming a metal to metal seal with an external cylindrical sealing surface; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal; and applying a differential pressure across the sealing device while the sealing device seals between an external cylindrical sealing surface and an internal cylindrical sealing surface.

The energization of the nonmetal seal may bias the first sealing surface against an internal cylindrical sealing surface and biases the second sealing surface against an external cylindrical sealing surface. The bias may be adjusted by altering the flexibility of at least one of the walls of at least one of the first sealing member, second sealing member, and combinations thereof. The flexibility of the at least one wall may be altered by adjusting the length, thickness, and combinations thereof, of the at least one wall. The method may further comprise a seal with at least one backup in the recess. The backup material may be at least one selected from the group consisting of plastic, PTFE, metal, and combinations thereof. The first and second sealing members may be attached by at least one of bolts, e-beam welding, and combinations thereof. The first metal sealing surface may only have one metal to metal contact surface with an internal cylindrical sealing surface, and the second metal sealing surface may only have one metal to metal contact surface with an external cylindrical sealing surface. Each of the metal to metal contact surfaces may be an equatorial ridge on each of the first and second metal sealing surfaces.

The following illustrative examples are given to introduce the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present disclosure.

Metal to Metal Seal

Figure 1:
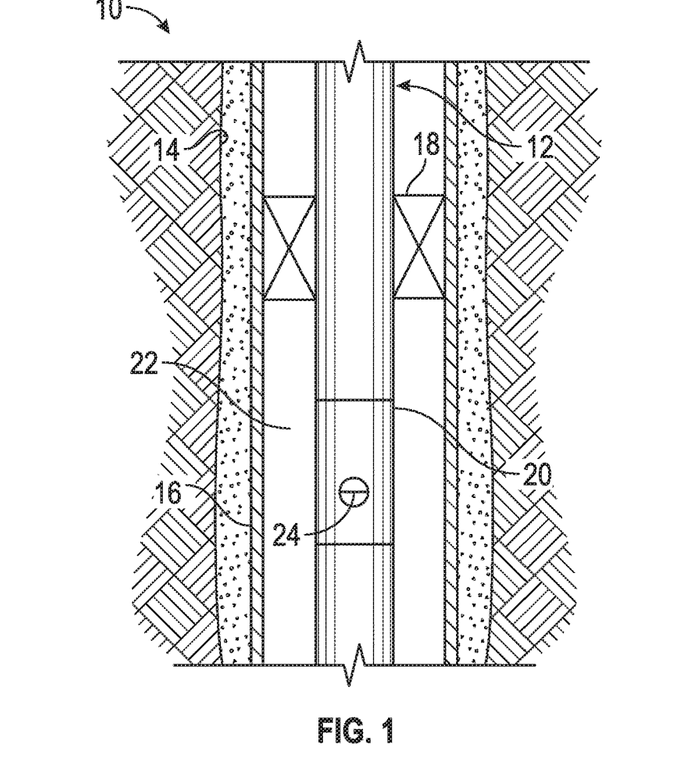
FIG. 1 is a schematic cross-sectional view of a wellbore system according to aspects of the disclosure.

The seal may comprise two pieces of metal that are either bolted or e-beam welded together. On the inside there is a static elastomeric seal with optional backups. Both metal pieces have holes for pressure communication between the inside and the outside of the seal. FIG. 1 is a wellbore system 10 in which aspects of the present disclosure may be implemented. In the wellbore system 10, a tubular string 12 (such as a production tubing string) is positioned in a wellbore 14 lined with casing 16. The tubular string 12 includes wellbore tools 18, 20, which, in this example, are more particularly a packer 18 and a flow control device 20.

The flow control device 20 may be a valve or choke for example. The packer 18 provides an annular seal between the tubular string 12 and the casing 16. The flow control device 20 regulates fluid communication between the interior of the tubular string and an annulus 22 formed between the tubular string and the casing 16. The flow control device 20 includes a closure mechanism 24 which is operated to regulate flow.

As a reminder, the aspects of this disclosure are not limited to any of the details of the wellbore system 10 described herein. For example, it is not necessary for the sealing device of this disclosure to be used in a wellbore, in a wellbore tool, in a cased wellbore, in a flow control device, in a tubular string, etc. The closure mechanism 24 could, as another example, be used in a hydraulic setting device of the packer 18, or could be used in another type of wellbore tool. Thus, it should be clearly understood that the wellbore system 10 is only a single example of a wide variety of uses for the principles of the disclosure.

Figure 2:
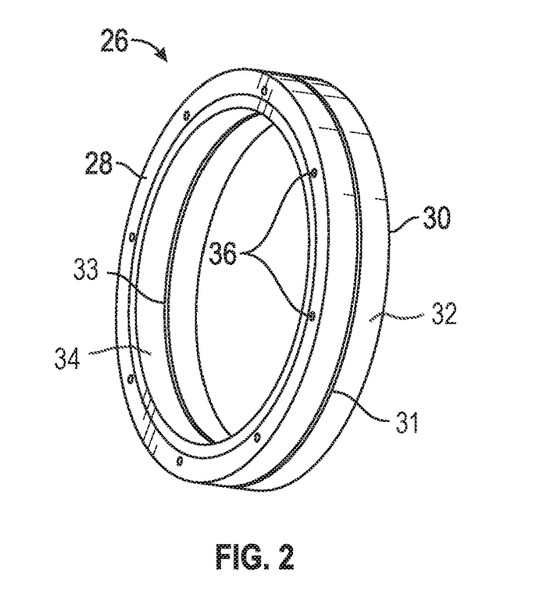
FIG. 2 is a perspective view of a metal to metal seal according to aspects of the disclosure.

FIG. 2 is a perspective view of a sealing device 26 which may be used for sealing in the closure mechanism 24 is representatively illustrated. However, it should be understood that the sealing device 26 may be used in many other sealing applications and is not necessarily used in the wellbore system 10.

The sealing device 26 depicted in FIG. 2 is a metal to metal seal with a first sealing member 28 and a second sealing member 30. The metal to metal seal 26 includes a first sealing surface 32, a second sealing surface 34, and pressure communication holes 36. In FIG. 2, the metal to metal sealing surfaces 32, 34, each only have one metal to metal contact surface shown as equatorial ridges 31, 33 on the first and second metal sealing surfaces 32, 34, respectively.

Figure 3A:
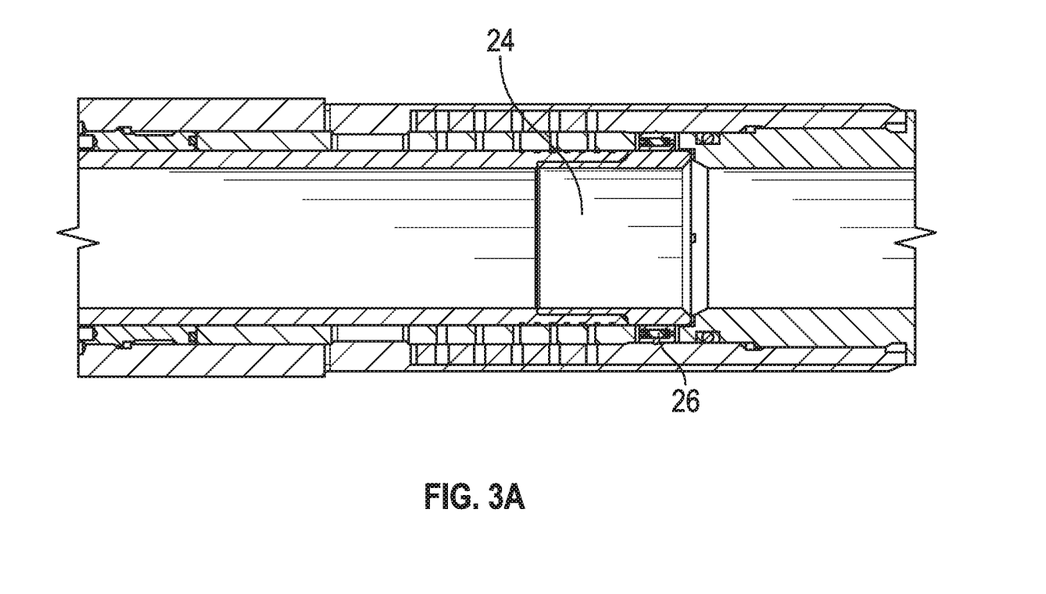
FIG. 3A is a cross-sectional view of a valve with a closure device in a closed position according to aspects of the disclosure.
Figure 3B:
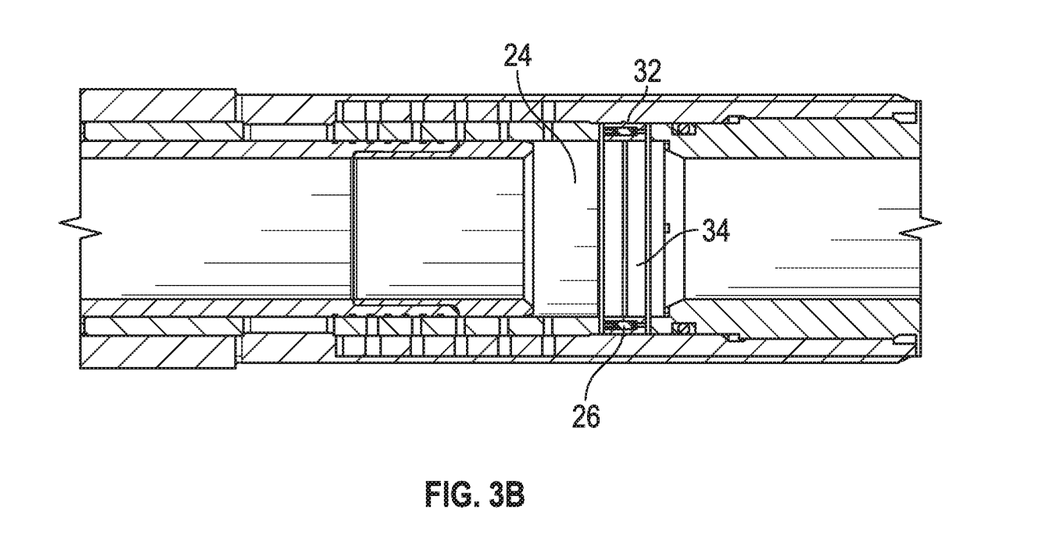
FIG. 3B is a cross-sectional view of a valve with a closure device in an open position according to aspects of the disclosure.

FIG. 3A is a cross-sectional view of a valve according to aspects of the disclosure. The second metal sealing surface 34 of seal 26 may be used to seal against an interior cylindrical sealing surface in closure mechanism 24. If the interior cylindrical sealing surface is made of a metal, then a metal to metal seal may be formed between the second sealing surface 34 and the internal cylindrical sealing surface. In FIG. 3A, the closure mechanism 24 is in a closed position. FIG. 3B is a cross-sectional view of a valve where the closure mechanism 24 has been moved away from seal 26, thereby showing the closure mechanism 24 in a partially open position.

Similarly, the first metal sealing surface 32 of seal 26 may be used to seal against an exterior cylindrical sealing surface in closure mechanism 24. If the exterior cylindrical sealing surface is made of a metal, then a metal to metal seal will be formed between the first sealing surface 32 and the exterior cylindrical sealing surface.

Figure 4:
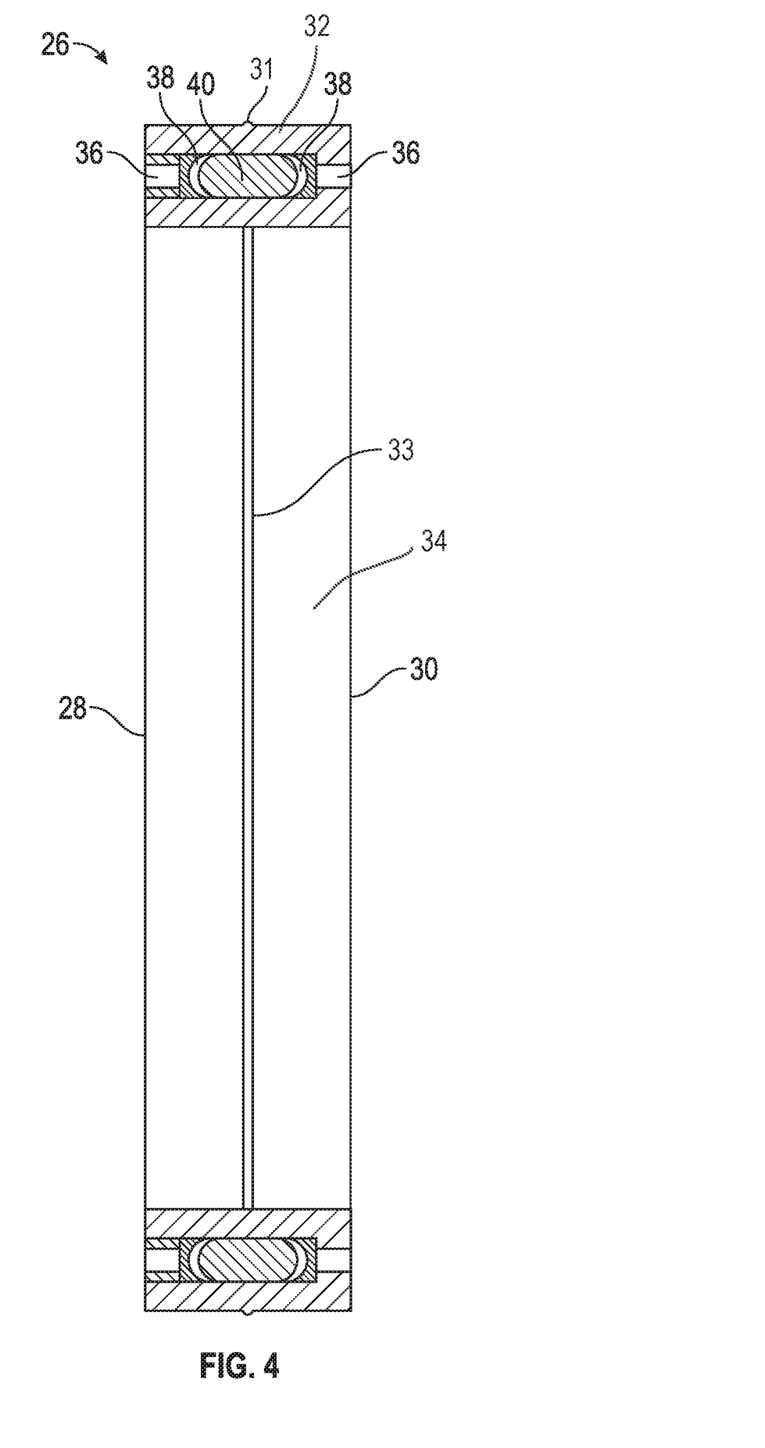
FIG. 4 depicts a cross-sectional view of a metal to metal seal according to aspects of the disclosure.

A cross-sectional view of the metal seal 26 is representatively illustrated in FIG. 4. A transverse facing recess 38 is positioned between the first and second metal sealing surfaces 32, 34. A nonmetal seal 40 is received in the transverse facing recess 38. Pressure communication holes 36, may be located on both sides of the metal seal 26.

Figure 5:
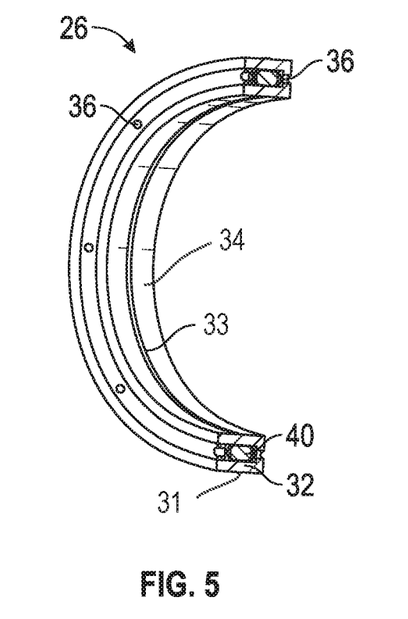
FIG. 5 depicts a profile cross-sectional view of a metal to metal seal according to aspects of the disclosure.

FIG. 5 is a profile cross-sectional view of a metal to metal seal according to aspects of the disclosure. The nonmetal seal 40 is in fluid communication with the pressure communication holes 36, and a pressure differential across the sealing device 26 energizes the nonmetal seal 40. The elastomeric seal 40 provides the pressure "energization" of the metal to metal sealing surfaces 32, 34. When pressure is applied from either direction, the pressure on the elastomeric seal 40 is transferred to the metal ridges 31, 33 increasing their contact pressure and boosting the sealing capability. This may allow low contact pressure (and low stroking forces) when no differential pressure is present and also allowing high contact pressure while sealing against high pressures.

Figure 6:
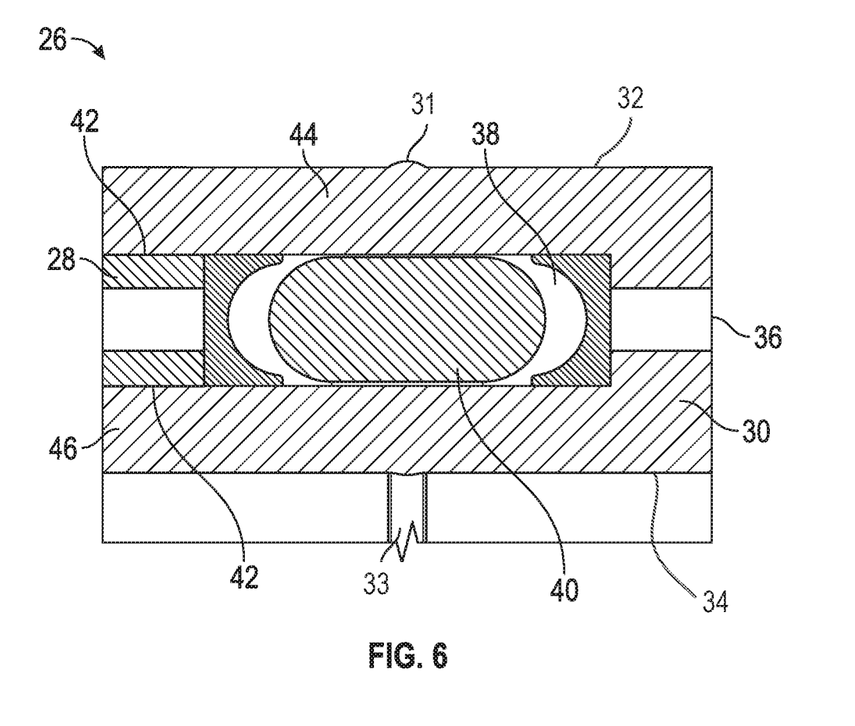
FIG. 6 is an enlarged scale cross-sectional view of a metal to metal seal according to aspects of the disclosure.

FIG. 6 is an enlarged scale cross-sectional view of the sealing device 26 depicting how the first sealing member 28 and the second sealing member 30 may be joined together to create a transverse facing recess 38. The first and second sealing members 28, 30 may be attached at 42 by at least one of bolts, e-beam welding, and combinations thereof. The energization of the nonmetal seal 40 deflects radially the first sealing surface 32 against an exterior cylindrical sealing surface and deflects radially the second sealing surface 34 against an interior cylindrical sealing surface. This deflection causes elastic deformation of the walls 44, 46 of the sealing members 28, 30, resulting in a biasing force being applied by the walls 44, 46 to the sealing surfaces 32, 34. The bias may be adjusted by altering the flexibility of at least one of the walls 44, 46 of at least one of the first sealing member 28, second sealing member 30, and combinations thereof. The flexibility of the metal walls 44 and 46 may be adjusted by changing their length, thickness, and combinations thereof. The biasing force may increase the contact pressure between the sealing surfaces 32, 34 of the seal and the surfaces of a tool to be sealed, such as the closure mechanism 24 in FIG. 3.

Figure 7A:
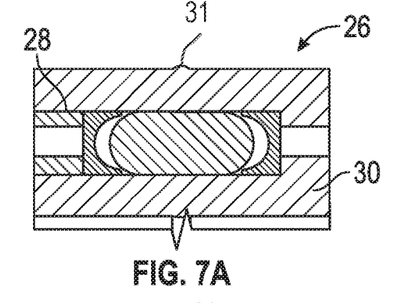
FIG. 7A is an enlarged scale cross-sectional view of components of metal to metal seals according to aspects of the disclosure.
Figure 7B:
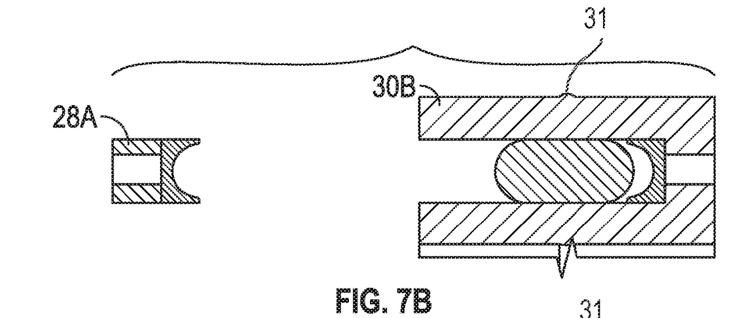
FIG. 7B is an enlarged scale cross-sectional view of deconstructed components of metal to metal seals according to aspects of the disclosure.
Figure 8A:
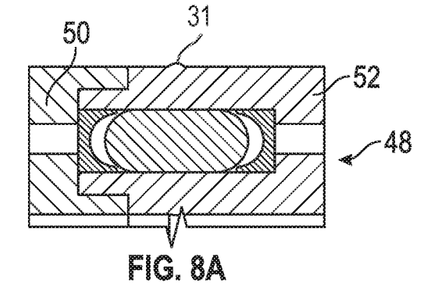
FIG. 8A is an enlarged scale cross-sectional view of components of metal to metal seals according to aspects of the disclosure.
Figure 8B:
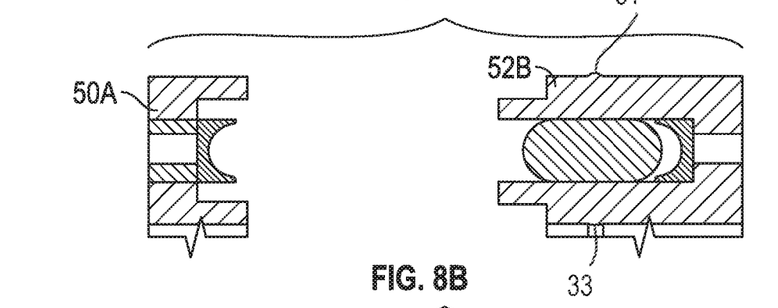
FIG. 8B is an enlarged scale cross-sectional view of deconstructed components of metal to metal seals according to aspects of the disclosure.
Figure 9A:
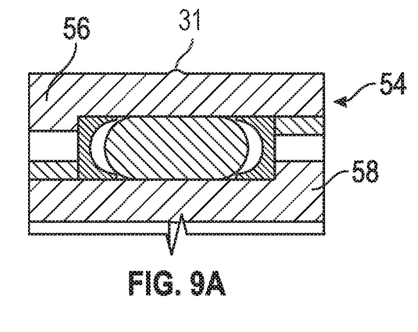
FIG. 9A is an enlarged scale cross-sectional view of components of metal to metal seals according to aspects of the disclosure.
Figure 9B:
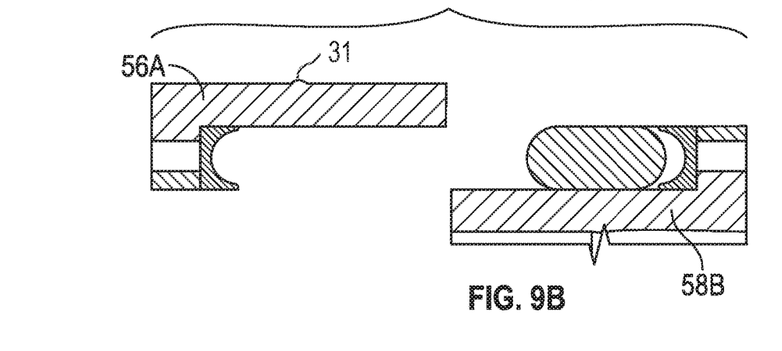
FIG. 9B is an enlarged scale cross-sectional view of deconstructed components of metal to metal seals according to aspects of the disclosure.

FIGS. 7-9 are demonstrating several ways in which the first sealing member 28 and the second sealing member 30 may be joined together. FIG. 7A is an enlarged scale cross-sectional view of components of metal to metal seals according to aspects of the disclosure. FIG. 7B is a deconstructed view of the components in FIG. 7A illustrating how sealing members 28A and 30B may come together to form sealing device 26. FIG. 8A is an enlarged scale cross-sectional view of components of metal to metal seals according to aspects of the disclosure. FIG. 8B is a deconstructed view of the components in FIG. 8A illustrating how sealing members 50A and 52B may be joined to form seal 48. FIG. 9A is an enlarged scale cross-sectional view of components of metal to metal seals according to aspects of the disclosure. FIG. 9B is a deconstructed view of the components in FIG. 9A illustrating how, in a preferred arrangement, sealing members 56A and 58B have an "L" type of configuration and may be joined together to form seal 54.

Figure 10:
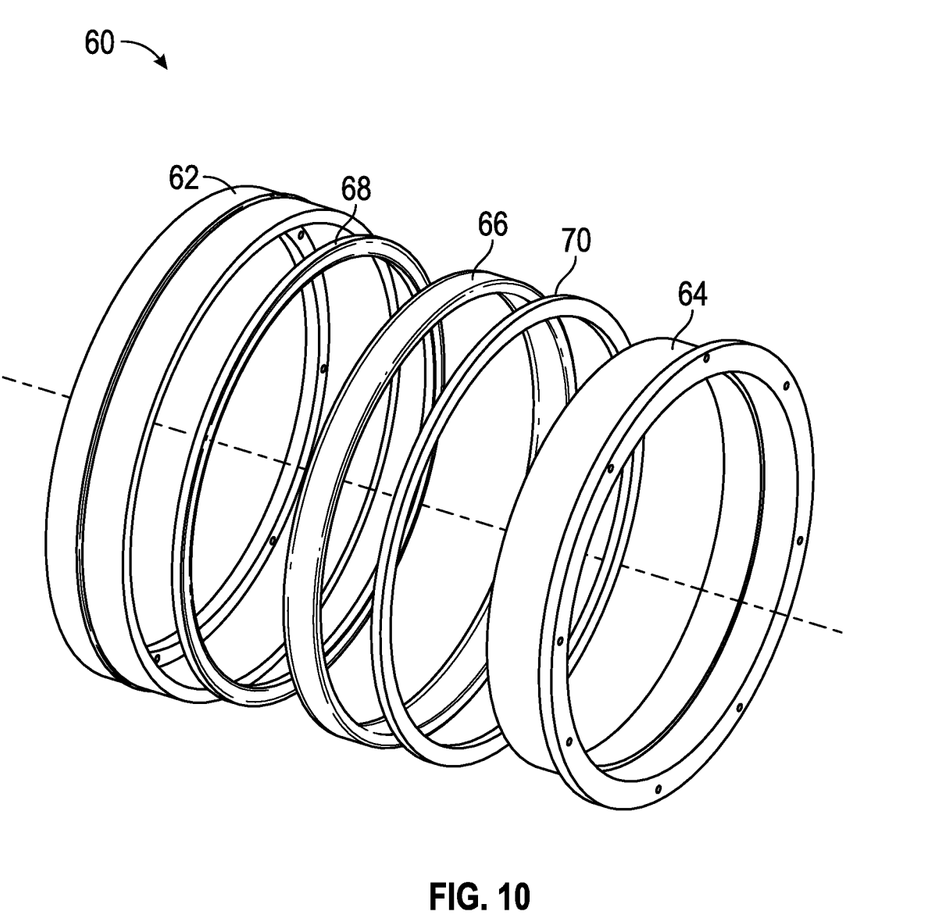
FIG. 10 is an exploded view of a seal according to aspects of the disclosure.

FIG. 10 is an exploded view of a seal 60 demonstrating how the various components of the seal 60 may be assembled together. Between first sealing member 62 and second sealing member 64 are an optional backup 68, a nonmetal seal 66, and an optional backup 70.

The metal to metal seals in the disclosure may be made of any material strong enough to create a two contact point seal under downhole conditions. The metal sealing surfaces are preferably made of strong, durable and resilient metals, such as Inconel 718, 13-chrome steel, stainless steel, etc. It should be clearly understood that any metal materials may be used for the metal seals in aspects of this disclosure. The metal ring may be stainless steel. The first and second sealing members may be attached by at least one of bolts, e-beam welding, and combinations thereof.

The nonmetallic portion of the seals may be made of high temperature resistant, well fluid resistant, strong, and elastomeric materials, such as NBR, HNBR, fluoroelastomers, etc. Non elastomeric materials, such as plastic, PTFE, metal, and combinations thereof, may additionally or alternatively be used in the nonmetallic portions of the seals. When used with the elastomeric materials, the non-elastomeric materials may be referred to as backups. PEEK may be used as a backup material.

One of skill in the art will realize that there are several benefits to the sealing devices and methods of the disclosure. One benefit is the possibility of low stroking forces. Because there are only two metal to metal contact points instead of the typical four, the stroke force may be half of the value in a four point contact seal. Further, the designs in the disclosure may eliminate pressure traps, which may result in significantly increasing stroking forces.

Additionally, the seals and methods of the disclosure may utilize pressure energization. When the pressure differential is applied across the seal, the nonmetallic seal transfers pressure to the metal walls in the sealing members, thereby increasing the contact pressure of the metal ridges and boosting their sealing capability. Further, the nonmetallic portion is static and may not be subject to wear from dynamic loading and/or erosion from pressure unloading.

Use in Wellbore

The disclosed sealing devices may directly or indirectly affect the various downhole equipment and tools that may come into contact with the sealing devices during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While preferred aspects of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Aspects disclosed herein include:

A: A wellbore tool comprising an internal cylindrical sealing surface; an external cylindrical sealing surface; and a sealing device for sealing between the internal and external cylindrical surface, the sealing device comprising: a first sealing member and a second sealing member, wherein the first and second sealing members are attached together to form a cylindrical sealing device; a first sealing surface and a second sealing surface on at least one of the first sealing member, the second sealing member, and combinations thereof, wherein the first metal sealing surface forms a metal to metal seal with the internal cylindrical sealing surface, and the second metal sealing surface forming a metal to metal seal with the external cylindrical sealing surface; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

B: A sealing device comprising a first sealing member and a second sealing member, wherein the first and second sealing members are attached together to form a cylindrical sealing device; a first sealing surface and a second sealing surface on at least one of the first sealing member, the second sealing member, and combinations thereof, wherein the first metal sealing surface forms a metal to metal seal with an internal cylindrical sealing surface, and the second metal sealing surface forming a metal to metal seal with an external cylindrical sealing surface; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

C: A method of sealing comprising providing a sealing device, comprising: a first sealing member and a second sealing member, wherein the first and second sealing members are attached together to form a cylindrical sealing device; a first sealing surface and a second sealing surface on at least one of the first sealing member, the second sealing member, and combinations thereof, wherein the first metal sealing surface forms a metal to metal seal with an internal cylindrical sealing surface, and the second metal sealing surface forming a metal to metal seal with an external cylindrical sealing surface; a transverse facing recess positioned between the first and second metal sealing surfaces; a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal; and applying a differential pressure across the sealing device while the sealing device seals between an external cylindrical sealing surface and an internal cylindrical sealing surface.

Each of aspects A, B, and C may have one or more of the following additional elements in any combination: Element 1: wherein the energization of the nonmetal seal biases the first sealing surface against the internal cylindrical sealing surface and biases the second sealing surface against the external cylindrical sealing surface. Element 2: wherein the bias is adjusted by altering the flexibility of at least one of the walls of at least one of the first sealing member, second sealing member, and combinations thereof. Element 3: wherein the flexibility of the at least one wall is altered by adjusting the length, thickness, and combinations thereof of the at least one wall. Element 4: further comprising at least one backup in the recess. Element 5: wherein the backup material is at least one selected from the group consisting of plastic, PTFE, metal, and combinations thereof. Element 6: wherein the first and second sealing members are attached by at least one of bolts, e-beam welding, and combinations thereof. Element 7: wherein the first metal sealing surface only has one metal to metal contact surface with the internal cylindrical sealing surface, and the second metal sealing surface only has one metal to metal contact surface with the external cylindrical sealing surface. Element 8: wherein each of the metal to metal contact surfaces is an equatorial ridge on each of the first and second metal sealing surfaces. Element 9: wherein the energization of the nonmetal seal biases the first sealing surface against an internal cylindrical sealing surface and biases the second sealing surface against an external cylindrical sealing surface.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

The invention claimed is:

1. A wellbore tool, comprising:
an internal cylindrical sealing surface;
an external cylindrical sealing surface; and
a sealing device for sealing between the internal and external cylindrical sealing surfaces, the sealing device comprising:
 a first sealing member and a second sealing member, wherein the first and second sealing members are attached together to form a cylindrical sealing device;
 a first sealing surface and a second sealing surface on at least one of the first seal member, the second seal member, and combinations thereof, wherein the first sealing surface forms a metal to metal seal with and only has one metal to metal contact surface with the internal cylindrical sealing surface, and the second sealing surface forming a metal to metal seal with and only having one metal to metal contact with the external cylindrical sealing surface;

a transverse facing recess positioned between the first and second metal sealing surfaces;

a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

2. The tool of claim 1, wherein the energization of the nonmetal seal biases the first sealing surface against the internal cylindrical sealing surface and biases the second sealing surface against the external cylindrical sealing surface.

3. The tool of claim 2, wherein the bias is adjusted by altering flexibility of at least one wall of at least one of the first sealing member, second sealing member, and combinations thereof.

4. The tool of claim 3, wherein the flexibility of the at least one wall is altered by adjusting a length, thickness, and combinations thereof of the at least one wall.

5. The tool of claim 1, further comprising at least one backup in the transverse facing recess.

6. The tool of claim 5, wherein a material of the backup is at least one selected from the group consisting of plastic, PTFE, metal, and combinations thereof.

7. The tool of claim 1, wherein the first and second sealing members are attached by at least one of bolts, e-beam welding, and combinations thereof.

8. The tool of claim 1, wherein each of the metal to metal contact surfaces is an equatorial ridge on each of the first and second metal sealing surfaces.

9. A sealing device, comprising:

a first sealing member and a second sealing member, wherein the first and second sealing members are attached together to form a cylindrical sealing device;

a first sealing surface and a second sealing surface on at least one of the first sealing member, the second sealing member, and combinations thereof, wherein the first sealing surface forms a metal to metal seal with and only has one metal to metal contact with an internal cylindrical sealing surface, and the second sealing surface forming a metal to metal seal with and only having one metal to metal contact with an external cylindrical sealing surface;

a transverse facing recess positioned between the first and second metal sealing surfaces;

a nonmetal seal received in the transverse facing recess; and at least one pressure communication hole on each of the first and second sealing members, wherein the nonmetal seal is in fluid communication with the pressure communication holes, and a pressure differential across the sealing device energizes the nonmetal seal.

10. The device of claim 9, wherein the energization of the nonmetal seal biases the first sealing surface against an internal cylindrical sealing surface and biases the second sealing surface against an external cylindrical sealing surface.

11. The device of claim 10, wherein the bias is adjusted by altering a length, thickness, and combinations thereof, of walls of at least one of the first sealing member, second sealing member, and combinations thereof.

12. The device of claim 9, further comprising at least one backup in the transverse facing recess.

13. The device of claim 12, wherein a material of the backup is at least one selected from the group consisting of plastic, PTFE, metal, and combinations thereof.

14. The device of claim 9, wherein the first and second sealing members are attached by at least one of bolts, e-beam welding, and combinations thereof.

15. The device of claim 9, wherein each of the metal to metal contact surfaces is an equatorial ridge on each of the first and second metal sealing surfaces.

16. A method of sealing, comprising:

providing a sealing device, comprising:

a first sealing member and a second sealing member, wherein the first and second sealing members are attached together to form a cylindrical sealing device;

a first sealing surface and a second sealing surface on at least one of the first sealing member, the second sealing member, and combinations thereof, wherein the first sealing surface forms a metal to metal seal with and only has one metal to metal contact with an internal cylindrical sealing surface, and the second sealing surface forming a metal to metal seal with and only having one metal to metal contact with an external cylindrical sealing surface;

a transverse facing recess positioned between the first and second metal sealing surfaces;

a nonmetal seal received in the transverse facing recess;

at least one pressure communication hole on each of the first and second sealing members, wherein the nonmetal seal is in fluid communication with the pressure communication holes, and a pressure differential across the sealing device energizes the nonmetal seal; and applying a differential pressure across the sealing device while the sealing device seals between the external cylindrical sealing surface and the internal cylindrical sealing surface.

17. The method of claim 16, wherein the energization of the nonmetal seal biases the first sealing surface against an internal cylindrical sealing surface and biases the second sealing surface against an external cylindrical sealing surface.

18. The method of claim 17, wherein the bias is adjusted by altering a length, thickness, and combinations thereof, of at least one wall of at least one of the first sealing member, second sealing member, and combinations thereof.

19. The method of claim 16, further comprising at least one backup in the transverse facing recess.

20. The method of claim 19, wherein a material of the backup is at least one selected from the group consisting of plastic, PTFE, metal, and combinations thereof.

21. The method of claim 16, wherein the first and second sealing members are attached by at least one of bolts, e-beam welding, and combinations thereof.

22. The method of claim 16, wherein each of the metal to metal contact surfaces is an equatorial ridge on each of the first and second metal sealing surfaces.

* * * * *